US007045659B2

(12) United States Patent
Delalu et al.

(10) Patent No.: US 7,045,659 B2
(45) Date of Patent: May 16, 2006

(54) PROCESS FOR THE SYNTHESIS OF MONOCHLORAMINE

(75) Inventors: Henri Delalu, Lyons (FR); Cécile Duriche, Lyons (FR); Jacques Berthet, Lyons (FR); Pierre Le Gars, Toulouse (FR)

(73) Assignees: Isochem, (FR); Centre National de la Recherche Scientifiques (CNRS), (FR); Universite Claude Bernard Lyon 1, (FR)

( * ) Notice: Subject to any disclaimer, the term of this patent is extended or adjusted under 35 U.S.C. 154(b) by 234 days.

(21) Appl. No.: 10/691,943

(22) Filed: Oct. 23, 2003

(65) Prior Publication Data

US 2004/0086577 A1 May 6, 2004

(30) Foreign Application Priority Data

Nov. 4, 2002 (FR) .................................. 02 13765

(51) Int. Cl.
*C01B 21/09* (2006.01)
*C07C 239/04* (2006.01)
*A01N 59/00* (2006.01)

(52) U.S. Cl. ...................... 564/118; 564/114; 424/600; 424/661; 424/721; 423/351; 423/413

(58) Field of Classification Search ................ 424/661, 424/600, 721; 564/114, 118; 423/351, 413
See application file for complete search history.

(56) References Cited

U.S. PATENT DOCUMENTS 3,254,952 A 6/1966 Raleigh et al.
6,222,071 B1 4/2001 Delalu et al.

OTHER PUBLICATIONS

Delalu, H. et al., "Synthesis of enriched solutions of chloramine starting from hypochlorite at high chlorometric degree," Chemical Engineering, 2001, vol. 83(3), pp. 219-224.*
Derwent Abstract 1991-118629; abstracting DE 4029119 (1991).*
Database WPI, Section Ch, Week 198828, Derwent Publications Ltd, London, BG; AN 1988-196157 XP002244861 (1988).
Database CA 'On Line' Chemical Abstracts Service, Columbus, Ohio, US; Delalu et al, "Synthesis . . . Degree" retrieved from STN, Database accession No. 135"290834 CA XP002244860 (2001).

* cited by examiner

*Primary Examiner*—John Pak
(74) *Attorney, Agent, or Firm*—Charles A. Muserlian

(57) ABSTRACT

The invention relates to a process for the synthesis of monochloramine by reaction of an ammonium chloride solution with a sodium hypochlorite solution. The sodium hypochlorite solution is basified beforehand with an inorganic base and the ratio of the concentration of ammonium chloride in the reaction medium to the concentration of sodium hypochlorite in the reaction medium is between 1 and 1.5. This ratio is preferably equal to 1.1.

9 Claims, No Drawings

PROCESS FOR THE SYNTHESIS OF MONOCHLORAMINE

The present invention relates to a process for the synthesis of monochloramine. More specifically, the present invention relates to a process for the synthesis of monochloramine by reaction of ammonium chloride with sodium hypochlorite.

One of the main applications of monochloramine is the synthesis of substituted or unsubstituted hydrazines, compounds used in the space industry for the manufacture of propellants, in agrochemistry for the synthesis of growth regulators or plant-protection products, or in the pharmaceutical industry.

A person skilled in the art already knows a process for the synthesis of monochloramine, by reaction of sodium hypochlorite with ammonia; it is the first stage of the Raschig process:

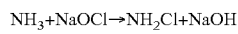
$$NH_3 + NaOCl \rightarrow NH_2Cl + NaOH$$

In such a synthesis, the ammonia is always used in excess with respect to the sodium hypochlorite. It is also known to use a mixed solution of ammonia and of ammonium chloride, the ratio of the concentration of total ammonia (ammonia and ammonium chloride) to the concentration of sodium hypochlorite being of the order of 3. The excess of ammonia with respect to the sodium hypochlorite is a necessary condition in order to obtain stable chloramine with a high yield. In point of fact, the disadvantage of such reaction conditions is the presence of hydrazine as reaction by-product. This is because, as ammonia is used in excess with respect to the sodium hypochlorite, it reacts with the chloramine thus synthesized to form hydrazine:

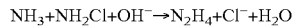
$$NH_3 + NH_2Cl + OH^- \rightarrow N_2H_4 + Cl^- + H_2O$$

As the Raschig process is used for the synthesis of monomethylhydrazine, the presence of hydrazine in the reaction medium is a major disadvantage. It is subsequently necessary to remove the hydrazine, either by distillation or catalytically, which greatly increases the cost of the process.

A person skilled in the art is therefore constantly searching for a process for the synthesis of monochloramine under stoichiometric conditions, that is to say without excess of ammonia, in order to avoid any parallel reaction between the monochloramine formed and the residual ammonia in the reaction medium.

Such a process is a subject-matter of the present invention.

The present invention also relates to a process for the synthesis of monochloramine by reaction of an ammonium chloride solution with a sodium hypochlorite solution at −15° to 0° C., characterized in that the sodium chlorite solution is basified beforehand with an inorganic base and in that the ratio of the concentration of total ammonia in the reaction medium to the concentration of sodium hypochlorite in the reaction medium is between 1 and 1.5.

The reaction is carried out "volume to volume", which means that the volume of the sodium hypochlorite solution used and the volume of the ammonium chloride solution used are identical.

This process makes possible the synthesis of monochloramine with a high yield, of greater than 95%, under "quasistoichiometric" conditions. The term "quasistoichiometric" conditions is used to describe reaction conditions under which the ammonium chloride is used in slight excess with respect to the sodium hypochlorite. Thus, any competitive reaction between the monochloramine formed and the ammonia remaining in the reaction medium is avoided. This process makes it possible to obtain a final solution concentrated in monochloramine and comprising very little ammonia. Thus, the level of residual ammonia is lower by approximately 95% in comparison with the processes of the state of the art.

Surprisingly, it has been found that the fact of using a sodium hypochlorite solution basified beforehand with an inorganic base makes it possible to synthesize chloramine under quasistoichiometric conditions with a very good yield, of greater than 95%, the chloramine thus synthesized being stable. In fact, comparative tests show that a simple adaptation of the conventional process, while operating under stoichiometric conditions, makes it possible to synthesize chloramine only with a low yield, of the order of 50%, the chloramine formed under such reaction conditions being unstable.

The inorganic base is preferably chosen from the group consisting of sodium hydroxide, potassium hydroxide and lithium hydroxide. In a particularly preferred way, the inorganic base is sodium hydroxide. The inorganic base used to basify the sodium hypochlorite solution is used either in the solid form or in the form of an aqueous solution. In a particularly preferred way, the inorganic base is used in the form of an aqueous solution. The concentration of the inorganic base in the sodium hypochlorite solution is generally between 0.05 mol/l and 1 mol/l, preferably between 0.1 mol/l and 0.5 mol/l. The pH of the reaction medium is thus between 8 and 11.

The sodium hypochlorite solution used is a bleach solution having a French chlorometric degree of between 45° (which corresponds to a sodium hypochlorite concentration of approximately 2 mol/l) and 70° (which corresponds to a sodium hypochlorite concentration of approximately 3 mol/l). The concentration of sodium hypochlorite in the reaction medium is between 0.5 mol/l and 1.5 mol/l.

The reaction is generally carried out at a temperature of between −15° C. and 0°C.

A preferred embodiment of the invention is now given. The reaction is carried out in a jacketed reactor, thus making possible the circulation of a temperature-controlled fluid between the two walls. The temperature within the reactor is between −15° C. and 0° C. An ammonium chloride solution is introduced into this reactor. A basified sodium hypochlorite solution is prepared. For this, an inorganic base, preferably in the form of an aqueous solution, and a sodium hypochlorite solution are mixed beforehand. The concentration of the inorganic base in the sodium hypochlorite solution is generally between 0.05 mol/l and 1 mol/l. The basified sodium hypochlorite solution is cooled to a temperature of between −20° C. and −5° C. and is introduced dropwise into the reactor using a dropping funnel. The volume of sodium hypochlorite solution introduced is identical to the volume of the ammonium chloride solution present in the reactor. The concentrations of the two solutions are chosen so that the ratio of the concentration of ammonium chloride in the reaction medium to the concentration of sodium hypochlorite in the reaction medium is between 1 and 1.5, preferably approximately 1.1. The concentration of the sodium hypochlorite in the reaction medium is generally between 0.5 mol/l and 1.5 mol/l. The addition of the sodium hypochlorite solution lasts approximately 15 minutes. The temperature of the reaction medium is between −15° C. and 0° C., preferably approximately −8° C. At the end of the reaction, a chloramine solution is obtained with a very good yield, of the order of 99%. The reaction medium comprises very little residual ammonia; its concentration is less than 0.2 mol/l.

The examples which follow illustrate, without implied limitation, possibilities for implementing the invention.

EXAMPLE 1

Synthesis of Chloramine from a 2.07 mol/l Sodium Hypochlorite Solution and a 2.28 mol/l Ammonium Chloride Solution The reaction is carried out in a 100 ml jacketed reactor made of borosilicate glass. The temperature within the reactor is maintained at −11° C. by circulation of a temperature-controlled fluid. 20 ml of a 2.28 mol/l ammonium chloride solution are introduced into this reactor. A 2.07 mol/l sodium hypochlorite solution is prepared, the sodium hydroxide concentration of which is 0.12 mol/l. 20 ml of the preprepared sodium hypochlorite solution, cooled to −15° C., are subsequently introduced dropwise into the same reactor. The concentration of ammonium chloride in the reaction medium is therefore 1.14 mol/l and the concentration of sodium hypochlorite in the reaction medium is therefore 1.035 mol/l. The ratio of the ammonium chloride concentration to the sodium hypochlorite concentration ($[NH_4Cl]/[NaOCl]$) is equal to 1.1. The addition lasts 15 minutes and is carried out using a dropping funnel. The temperature of the reaction medium settles at −7° C. with stirring.

At the end of the reaction, a 1.03 mol/l chloramine solution is obtained, which corresponds to a yield of 99.5%. The residual total ammonia concentration is measured; it is 0.105 mol/l.

EXAMPLE 2

Synthesis of Chloramine from a 3 mol/l Sodium Hypochlorite Solution and a 3.34 mol/l Ammonium Chloride Solution The reaction is carried out in a 100 ml jacketed reactor made of borosilicate glass. The temperature within the reactor is maintained at −12° C. by circulation of a temperature-controlled fluid. 20 ml of a 3.34 mol/l ammonium chloride solution are introduced into this reactor. A 3 mol/l sodium hypochlorite solution is prepared, the sodium hydroxide concentration of which is 0.3 mol/l. 20 ml of the preprepared sodium hypochlorite solution, cooled to −5° C., are subsequently introduced dropwise into the same reactor. The concentration of ammonium chloride in the reaction medium is therefore 1.17 mol/l and the concentration of sodium hypochlorite in the reaction medium is therefore 1.5 mol/l. The ratio of the ammonium chloride concentration to the sodium hypochlorite concentration ($[NH_4Cl]/[NaOCl]$) is equal to 1.1. The addition lasts 15 minutes and is carried out using a dropping funnel. The temperature of the reaction medium settles at −8° C. with stirring.

At the end of the reaction, a 1.43 mol/l chloramine solution is obtained, which corresponds to a yield of 95.3%. The residual total ammonia concentration is measured; it is 0.17 mol/l.

The following Examples 3 and 4 do not form part of the invention. They were carried out for the purpose of showing, first, the improvement brought about by the process which is a subject-matter of the invention in comparison with the state of the art and, secondly, that the process which is a subject-matter of the invention is not a simple adaptation of the process already known to a person skilled in the art.

EXAMPLE 3

Synthesis of Chloramine, According to the 1$^{st}$ Stage of the Raschig Process, from a 2.01 mol/l Sodium Hypochlorite Solution and a 3.60 mol/l Ammonia and 2.38 mol/l Ammonium Chloride Mixed Solution The reaction is carried out in a 100 ml jacketed reactor made of borosilicate glass. The temperature within the reactor is maintained at −11° C. by circulation of a temperature-controlled fluid. 20 ml of a 3.6 mol/l ammonia and 2.38 mol/l ammonium chloride mixed solution are introduced into this reactor. 20 ml of a 2.01 mol/l sodium hypochlorite solution, cooled beforehand to −15° C., are subsequently introduced dropwise into the same reactor. The ratio of the concentration of total ammonia to the concentration of sodium hypochlorite (($[NH_4Cl]+[NH_3])/[NaOCl]$) is equal to 2.9. The addition lasts 15 minutes and is carried out using a dropping funnel. The temperature of the reaction medium settles at −7° C. with stirring.

At the end of the reaction, a 1.00 mol/l chloramine solution is obtained, which corresponds to a yield of 99.9%. The residual total ammonia concentration is measured; it is 1.99 mol/l, which is markedly greater than the residual total ammonia concentration obtained according to the process which is a subject-matter of the invention.

EXAMPLE 4

Synthesis of Chloramine, According to the 1$^{st}$ Stage of the Raschig Process, Under Stoichiometric Conditions, that is to Say from a 2.17 mol/l Sodium Hypochlorite Solution and a 2.38 mol/l Ammonia Solution The reaction is carried out in a 100 ml jacketed reactor made of borosilicate glass. The temperature within the reactor is maintained at −11° C. by circulation of a temperature-controlled fluid. 20 ml of a 2.38 mol/l ammonia solution are introduced into this reactor. 20 ml of a 2.17 mol/l sodium hypochlorite solution, cooled beforehand to −15° C., are subsequently introduced dropwise into the same reactor. The ratio of the concentration of ammonia to the concentration of sodium hypochlorite ($[NH_3]/[NaOCl]$) is equal to 1.1. The addition lasts 15 minutes and is carried out using a dropping funnel. The temperature of the reaction medium settles at −5° C. with stirring.

At the end of the reaction, a 0.59 mol/l chloramine solution is obtained, which corresponds to a yield of 54.3%, a yield markedly lower than that obtained according to the process which is a subject-matter of the invention.

The invention claimed is:

1. Process for the synthesis of monochloramine by reaction of an ammonium chloride solution with a sodium hypochlorite solution at −15° to 0° C., characterized in that the sodium hypochlorite solution is basified beforehand with an inorganic base and in that the ratio of the concentration of total ammonia in the reaction medium to the concentration of sodium hypochlorite in the reaction medium is between 1 and 1.5.

2. Process according to claim 1, characterized in that the ratio of the concentration of ammonium chloride in the reaction medium to the concentration of sodium hypochlorite in the reaction medium is 1.1.

3. Process according to claim 1, characterized in that the inorganic base is chosen from the group consisting of sodium hydroxide, potassium hydroxide and lithium hydroxide.

4. Process according to claim 3, characterized in that the inorganic base is sodium hydroxide.

5. Process according to claim 1, characterized in that the inorganic base is used in the form of an aqueous solution.

6. Process according to claim 1, characterized in that the concentration of the inorganic base in the sodium hypochlorite solution is between 0.05 mol/l and 1 mol/l.

7. Process according to claim 6, characterized in that the concentration of inorganic base in the sodium hypochlorite solution is between 0.1 and 0.5 mol/l.

8. Process according to claim 1, characterized in that the volume of the sodium hypochlorite solution used and the volume of the ammonium chloride solution used are identical.

9. Process according to claim 1, characterized in that the concentration of sodium hypochlorite in the reaction medium is between 0.5 mol/l and 1.5 mol/l.

* * * * *